United States Patent Office 3,352,839
Patented Nov. 14, 1967

3,352,839
DIOLEFIN POLYMERIZATION CATALYSTS USING A METALLIFEROUS COMPONENT, A CATALYST REGULATOR AND AIX₃
Marvin H. Lehr, Akron, Ohio, assignor to Goodrich-Gulf Chemicals, Inc., Cleveland, Ohio, a corporation of Delaware
No Drawing. Filed Aug. 10, 1962, Ser. No. 216,047
6 Claims. (Cl. 260—94.3)

This invention relates to catalysts and to processes useful in the polymerization of monomeric poylolefins. More particularly, this invention relates to the stereo-regulated polymerization of monomeric diolefins to form polymers having improved physical properties.

Although the ability to polymerize organic monomers capable of stereoisomerism in a structurally homogeneous fashion was a skill long sought by chemists throughout the world, until comparatively recently, all attempts to produce polymers having a uniform stereo configuration ended in failure, the resulting products invariably including both the cis and trans polymers. Following extensive experimentation, a method was eventually found, however, by which polymers having a desirably uniform stereo structure could be prepared. The method originally discovered makes use of catalysts containing certain transition metal compounds in conjunction with organometallic substances, i.e., compounds having at least one direct bond between a metal atom such as aluminum and a carbon atom located in a hydrocarbon portion of the molecule.

Using the organometallic type catalyst compounds described, a great many polymers displaying regulated stereoisomerism can readily be prepared. Happily, the polymeric materials thus obtained possess improved properties markedly dissimilar to those shown by chemically identical, but structurally heterogeneous isomeric polymers. Depending on their stereo form, the new materials have, for example, superior flex properties—low hysteresis characteristics, much better abrasion resistance, a longer useful life, and many additional advantages.

Although polymers resulting from application of the new catalysts show properties of considerable commercial worth, the catalysts themselves have proven difficult to work with, particularly on the large scale required by practical manufacturing processes. Organometallic catalysts of the type described are, for instance, spontaneously flammable upon contact with the atmosphere. Furthermore, the extremely reactive nature of such catalysts makes special techniques in their preparation and handling mandatory, while due to adventitiously introduced substances such as air and the like, their storage life is somewhat limited. For the above and other reasons, therefore, the discovery of alternative catalysts useful in the preparation of polymers possessing a uniform stereo structure is desirable.

Now, an improved method has been discovered by which valuable stereoregulated polymers can be produced from diolefin monomers. While the polymers produced have clearly superior physical properties as compared to polymers containing mixed stereoisomers, their production does not require the use of hazardous organometallic catalyst components. The catalysts employed are apparently not as sensitive to the presence of contaminants as organometallic compounds; consequently, such catalysts can readily be prepared and stored for relatively long periods, prior to use, without substantially detracting from their efficiencies. Furthermore, the catalysts of the invention are substantially more catalytically active than the inorganic catalysts previously known, and smaller amounts of such catalysts may be used to produce comparable results.

In accordance with this invention, a method has been discovered for manufacturing a polymeric product substantially all of which is of a stereoregulated type. The method of the invention produces stereospecific 1,4-polydiolefin products by a process which includes contacting a 1,3-diolefin monomer with a catalyst comprised of an aluminum trihalide; a component chosen from the group consisting of a substance containing a transition metal, a beryllium containing substance, and a substance containing magnesium; a halide of an alkali metal; and a catalyst regulator component, until the monomer has been polymerized to the degree desired.

The polymerization process of the invention may be carried in a variety of ways. A stereo-directive catalyst can, for instance, be obtained by preparing a fusion mixture containing a "metalliferous component," i.e., a term to be construed herein as meaning a member of the group which consists of a substance containing a transition metal, a beryllium containing substance, and a substance containing magnesium; in combination with an aluminum trihalide and an alkali metal halide. A suitable fusion can be prepared simply by heating ingredients of the above type until a homogeneous melt results; however, the presence of the components in amounts such that a eutectic mixture is produced has certain advantages. In any event, the fused composition may subsequently be added to the reaction mixture and brought into contact with a catalyst regulator component, infra, at the latter point. Alternatively, active catalyst may be formed in situ. This can be accomplished by adding the catalyst components including the aluminum trihalide, the metalliferous component, the alkali metal halide and the catalyst regulator directly to the reaction mixture to form a catalytically active solution. Irrespective of the physical form of the catalyst employed in the process, however, the catalyst is brought into contact with the monomer to be polymerized, in the presence of an inert polymerization medium if preferred, and the reaction is continued until the desired polymer has been obtained. The reaction mixture is then united with a catalyst deactivating agent, thus terminating the polymerization reaction, and the polymeric product is subsequently separated from the reaction mixture, including catalyst residues, and dried.

The nature of the catalysis involved in preparation of the stereospecific polymers by means of the process of the invention is not clearly understood. However, although the invention is not to be considered predicated on the theory, from the experimental evidence it is deduced, at least in some instances, that part of the operative mechanism involves the formation of a relatively unstable complex involving the aluminum halide and metalliferous constituents of the catalyst. It is known, for example, that when certain metal halide solids having a blue color are exposed to aluminum bromide vapors, the gradual formation of a green complex is observed. When the aluminum bromide and the same metal halides are melted together, formation of the green complex appears immediately. Furthermore, although benzene is a non-solvent for the metal halides, when aluminum chloride and metal halides are added to the benzene medium contemporaneously, solution of the metal halide compounds does occur. It has also been observed that combinations of the components suspected of containing a complex produce an electron paramagnetic resonance signal. The fact that such a signal is observed, by itself, indicates that a complex is involved since the metal halides give a non-observable broad line spectrum when examined by themselves. An observable signal appears only when the degenerate orbitals of the metal compound are split into higher and lower energy levels through a complexing mechanism. Additional evidence including X-ray spectra, fractional sublimation and the like also seems to indicate formation of a complex between the aluminum halide and certain of the metalliferous constituents of the catalyst.

Peculiarly, while the alkali metal halides are substantially insoluble in aromatic compounds such as benzene, when the former halides are present in such a medium together with an aluminum halide, solution of the alkali metal halides does occur. This phenomenon is identical with that observed in the case of the metal halides above-described, and as previously mentioned, it tends to indicate formation of a soluble complex. If in fact the latter complex exists, it may interact with the supposed metal-liferous-aluminum halide complex to form the catalytically necessary ingredient. Whatever the mechanism, however, inclusion of the alkali halide in inorganic catalysts of the type contemplated by the invention permits the amount of aluminum halide which can be dissolved in the catalyst mixture to be increased by a substantial factor, resulting in more concentrated catalyst solutions, and produces far more active catalysts than can be obtained in its absence.

While the action of the catalyst regulator is not known with certainty, part of its function may be to surpress any competing Friedel-Crafts reaction taking place in the polymerization system; however, certain observations strongly suggest that the action of the regulator is not confined to a surpressant role. Irrespective of the precise manner in which the regulator promotes the reaction, the necessity of including such a substance is evidenced by the fact that if such a regulator is not included, a polymerization employing the components disclosed herein usually produces a heterogeneous product, combined in the unsuitable 1,2 and/or 3,4 structures as well as the desirable 1,4 structure containing a considerable amount of undesirable phenylated polymer. Such a product possesses properties which are of reduced commercial worth.

The catalyst and process of the invention may be used to polymerize any of a wide variety of unsaturated monomers; however, the system is primarily intended for use in the stereoregulated polymerizations of monomeric diolefins especially 1,3-diolefins, and it has been found to be particularly suited to the formation of substantially stereospecific 1,4-polybutadiene. When used in accordance with the procedures disclosed, the process can be successfully used to produce polymeric materials of desirably high molecular weight. Polymeric materials containing from 80% to 90% of the desired stereo structure which include a relatively high proportion of the advantageous 1,4 form of the polymer can readily be obtained, and a product having a stereospecificity approaching 100% while including less than 5% of the 1,2 structure is not uncommon in the preferred modes of operation.

Not only are the catalysts disclosed capable of producing a highly directive polymerization, however, but in addition, stereoregulation is achieved with catalysts markedly less expensive and more efficient than the inorganic catalysts of the types previously known, supra. The advantages to be gained from use of the catalysts disclosed herein are readily apparent from polymerization experiments, conducted for the purpose of comparison, in which it is possible to reduce the amount of metalliferous constituent of the catalyst, an expensive component, to values far less than those required in similar catalysts not including alkali metal halides. Not only, however, can the cost of the catalyst be reduced through reduction of one of the more expensive of the catalyst components without sacrifices of catalytic efficiencies, but also the amount of aluminum halide and thus the amount of complete catalyst which can be incorporated into a particular quantity of reaction medium can be appreciably increased. It is, for example, possible through suitable addition of the alkali metal halides to double the amount of aluminum halide dissolved in the reaction medium, and while it is not to be considered as a maximum value, increases in solubility up to 1000% can be obtained. The possibility of producing catalyst solutions having a highly concentrated nature permits corresponding reductions to be made in the size of processing equipment required by the process, thereby effecting considerable and important economies.

The catalyst components found necessary for successfully practicing the process of the invention include an aluminum halide; a metalliferous constituent; an alkali metal halide and a catalyst regulator. The aluminum compound required for preparation of the catalyst can be any inorganic aluminum halide compound having Friedel-Crafts activity, i.e., activity in Friedel-Crafts reactions and/or the ability to induce heterogeneous polymerizations of 1,3-diolefins, and may be selected from many different halogen-aluminum compounds. The use of compounds having an appreciable solubility in the reaction mixture however, is to be preferred over those having only slight solubility in the mixture. Suitable aluminum halides can be found, for example, among compounds containing aluminum in combination with a particular halogen or in compounds containing aluminum combined with more than one kind of halogen, that is, mixtures of halogens can be employed.

Operative compounds include substances such as, for example, aluminum trichloride, aluminum tribromide, aluminum triiodide, complex aluminum halides such as aluminum fluorodiiodide, aluminum iododichloride, aluminum bromodichloride, aluminum chlorodifluoride, aluminum bromodiiodide, aluminum dibromoiodide, and mixtures of any of the preceding as well as other aluminum halide compounds. Particularly effective polymerizations, however, have been conducted when the aluminum halide compound included in the catalyst mixture is either aluminum trichloride or aluminum tribromide.

The catalyst of the invention requires the use of certain metalliferous substances to obtain suitably directive polymerizations. Among those substances which may be successfully used, either individually or as mixtures, are substances containing certain transition metals, beryllium containing substances, and substances containing magnesium. Certain advantages have been found, however, to reside in the use of substances containing transition metals, and among such, substances containing cobalt, and nickel containing substances are, for various reasons, preferred as catalyst components.

Among the magnesium compounds found adapted to use in the invention are any of various magnesium containing substances, including—but not limited to—materials such as, for example, magnesium halides, magnesium oxides, magnesium hydroxides, magnesium compounds formed from organic and inorganic acids, magnesium metal, complexes containing magnesium, as well as numerous additional salts and other types of compounds containing magnesium. While the list is not to be construed as comprehensive, any substance such as magnesium chloride, magnesium bromide, magnesium iodide, magnesium oxide, magnesium hydroxide and the like may all be employed. Certain advantages reside, however, in the use of magnesium halides, particularly in the chloride, and the use of such compounds is preferred.

Similarly, when beryllium is employed for forming the catalyst, any of a great variety of substances including beryllium halides, oxides, hydroxides, salts of organic as well as inorganic acids and complexes containing beryllium may be chosen for the purpose. Specifically, beryllium compounds such as beryllium chloride, beryllium iodide, various other halo-beryllium compounds, beryllium oxides, beryllium hydroxide, beryllium stearate, beryllium sulphate and other additional beryllium compounds are suitable. In view of their toxic nature, reasonable care should be exercised in the handling of beryllium containing substances.

Included in the transition metal containing substances which have been found to have the ability, when combined with the other catalyst components disclosed herein, to polymerize the diolefins contemplated by the invention in a stereoregulated fashion are substances containing cobalt, nickel, chromium, manganese, iron, platinum, palladium, titanium, and vanadium. Among those titanium compounds found adapted to use in the invention, compounds in which the titanium is present in a plus 2 oxidation state have been determined to be particularly effective in forming the trans stereoisomers. Included in the types of compounds suitable for catalytic purposes are materials such as, for example, titanium halides, titanium salts formed from organic and inorganic acids, complexes containing titanium, and numerous other types of compounds. While the list is not to be considered as limiting the materials which can be used, any substances such as titanium dichloride, titanium dibromide, titanium diiodide and many other titanium containing materials may be employed. Certain advantages reside in the use of titanium halides, however, particularly in the chloride, and the use of such compounds is preferred.

Likewise, when vanadium is to be employed for the formation of the catalysts, any of various compounds including halides, oxides, salts of organic as well as inorganic acids, and complexes containing vanadium may be chosen for the purpose. Compounds in which the vanadium is present in the plus 2 or 3 oxidation states produce especially active catalysts, and such materials are preferred. Specifically, vanadium compounds such as vanadium dichloride, vanadium trichloride, vanadium diiodide, vanadium triiodide and various other halo-vanadium compounds, vanadium oxide, vanadium hydroxide, vanadium sulphide, vanadium sulphate and additional vanadium containing materials are suitable.

Cobalt may be utilized in the procedures disclosed herein in the form of the metal itself, or in the form of any of its compounds such as its salts of inorganic and organic acids, its oxides, hydroxides, and complexes as well as other forms. Operable cobalt containing substances comprise, for example, such materials as anhydrous cobaltous halides including cobaltous fluoride, cobaltous chloride, cobaltous bromide, cobaltous iodide, cobaltous chlorobromide, cobaltous chlorofluoride, and others. Cobaltous sulphate, cobaltous nitrate, cobaltous orthophosphate, cobaltous orthotitanate, salts of other inorganic acids; cobaltous hydroxide; cobaltous acetate, cobaltous octoate, cobaltous palmitate, cobaltous stearate, cobaltous tartrate, cobaltous benzoate, cobaltous phthalate, cobaltous naphthanate, cobaltous maleate and additional organic acid salts; cobaltamine complexes such as cobalt/pyridine complexes; cobalt acetylacetonate; cobalt salts of nitric acid and of sulfuric acid; hydrohalogen acids; perhalogenated carboxylic acids such as perfluoro-butyric acid and perfluoro-octanoic acid; hydrocarbon sulfonic acids; hydrocarbon halosulfonic acids, and many other cobalt containing materials may all be successfully employed for the purpose.

Finely divided metallic nickel can be utilized in the preparation of the catalysts as well as the divalent nickel salts corresponding to those mentioned above, particularly nickelous chloride, nickelous bromide, and nickelous iodide. Nickelous fluosilicate, nickelous hydroxide, nickelous benzene sulphonate, nickelous acetate, nickelous stearate, nickelous salts of the perfluoro carboxylic acids, and many others are also operable.

Chromium is similar and can be employed in a similar fashion. Among the operable compounds chromous halides such as chromous chloride, chromous bromide, and chromous iodide are preferred.

Manganese may likewise be utilized in compounds corresponding to any of the above, as well as in compounds such as manganous chloride, manganous bromide, manganous iodide, manganous hydroxide, manganous sulphate, manganous nitrate, manganous fluosilicate, manganous acetate, manganous valerate, manganous tartrate, and many others. In the preferred embodiment of the invention, manganous halides are used.

Iron is comparable and may be employed, for example, in the form of ferrous chloride, ferrous bromide, ferrous iodide, ferrous sulphate, ferrous hydroxide, ferrous ferrocyanide, ferrous tartrate, and various other iron containing substances. Ferrous halides are particularly effective when used in the process of the invention.

Platinum can be used in the form of substances such as, for instance, platinous chloride, platinous bromide, platinous sulphate, and many other +2 valence platinum compounds. Platinous halides are to be preferred for the purpose.

The term alkali metal halide, as used herein, means the halide of any of the alkali metals, i.e., those metals constituting the first group of the Periodic System, as shown in Mendeléeff's Table appearing in Lange's Handbook of Chemistry, 9th edition, page 56, and including the elements lithium, sodium, potassium, rubidium, cesium, francium and mixtures of any of them. Halides formed from sodium, potassium and lithium such as, for example, sodium chloride, potassium chloride, lithium chloride and the like, are especially adapted to use in the invention, and employment of such compounds is to be preferred; however, any of the alkali metal halides including fluorides, chlorides, bromides and iodine compounds, and mixtures of them can be used in the catalyst.

When employed for catalytic purposes in the process, it is preferred that the catalyst constituents be in a substantially anhydrous form. Since any water which is present may be eliminated either during preparation of the catalyst or in the reaction mixture, it is not to be inferred, however, that completely anhydrous ingredients must be used to prepare the catalyst formulation. Water elimination may occur, for instance, when the catalyst is prepared from a fusion of the catalyst components. Substantially all of the water present in the components is driven off during such a fusion and is, consequently, no longer available for interferring with the polymerization reaction. Furthermore, in those polymerizations carried out in the presence of an excess of aluminum trihalide, any water contained by the system is eliminated through reaction with the aluminum compound, sufficient active halide remaining in such cases to catalyze the polymerization. Anhydrous materials may readily be prepared by gently heating them, in the presence of a reduced atmosphere if desired, and driving off the combined water or, alternatively, by combining the water containing substances with a suitable azeotrope forming hydrocarbon and distilling off the water containing azeotrope until the materials are substantially dehydrated. It is sometimes of advantage to include a small amount of a proton-accepting metal such as, for instance, aluminum with the catalyst forming materials. Among other things, such a metal can accomplish removal of traces of hydrochloric acid resulting from the reaction of water with certain of the catalyst components.

A catalyst system consisting of an aluminum trihalide, a metalliferous ingredient and an alkali metal halide can, by itself, be used to catalyze a polymerization reaction of unsaturated monomeric materials. It has been found, however, that unless such a catalyst mixture contains what is, for the purposes of the invention, designated a catalyst "regulator" (which may consist of "primary" or "secondary" regulators, infra, or combinations of them), a polymerization capable of yielding a significant portion of a particular stereoisomer, predominating in the 1,4 type structure and containing only a minimal amount of phenylated polymer—the type of product produced by this invention—cannot be achieved. It is for this reason that such a regulator is included as an integral part of the catalyst system of the invention. While, as previously indicated, the precise nature of the action of the catalyst regulator on the catalytic system is not fully understood, various materials have been discovered which will produce the desired effect.

Among the substances which have thus been found to produce the stereo-directive effect are thiophene compounds. It is to be understood that the term "thiophene compound" is not restricted herein to mean thiophene alone. The term comprehends additional thiophene compounds including vinyl as well as other substituted thiophene molecules.

Also found satisfactory for the purpose of creating a catalyst system capable of producing stereospecific polydiolefin products are various amine compounds. The amine regulators, when used in a system containing various aliphatic hydrocarbons including compounds such as, for instance, butene-1, pentene-1, hexene-1, and the like, in combination with an aromatic compound, for example benzene, are particularly effective for such use. Such a system may conveniently be adjusted from the point at which the solvent is substantially all aromatic i.e., benzene, to the place where the solvent mixture contains only about 5% by weight of the aromatic, the balance being of the unsaturated type. Although many different types of amines are suitable for the purpose, aliphatic amines, and in particular trialkyl amines, have proved to be particularly useful in the practice of the invention. Illustrative amines include compounds such as, for example, triethyl amine, tri-n-butyl amine, trihexyl amine, tri-2-ethylhexyl amine, tridecyl amine, but others, of course, are equally useful. While the amines are included primarily for the purpose of obtaining the desired directive effect, such materials also serve to enhance the solubilizing characteristics of the reaction medium and are desirable catalyst components for that reason also.

In addition to the foregoing, certain additional substances, which have been found to possess a regulative effect, may be substituted for the above principal, or "primary" regulators. Such materials include various alkyl sulfides, pyridine compounds, ethers—both cyclic and aliphatic, and similar substances. Among suitable materials, may be mentioned, n-propyl sulfide, n-butyl sulfide, t-butyl sulfide, pyridine "Ferrocene," i.e., bis cyclopentadienyl iron, tetrahydrofuran, and various additional compounds. Suitable amine compounds such as the tertiary amines including compounds as, for example, triethyl amine, tri-n-amyl amine and the like may, if desired, be used in combination with the thiophene compounds mentioned above to produce the regulative effect. The foregoing substances, while normally employed in a "secondary" regulative role, i.e., as a partial substitute for primary regulators, may in many instances be employed for regulative purposes by themselves. When secondary regulators are used, the use of such regulators as a replacement for up to about four-fifths, on a molar basis, of the primary regulators produces a particularly desirable effect; however, as previously stated, higher replacements may be made. In those instances where the secondary regulators are employed by themselves, the use of as little as about one mole of regulator for every 3–5 moles of aluminum halide can accomplish regulation. The use of such materials as substitutes for thiophene has proven to be of considerable advantage, especially when cobalt or nickel containing substances are employed as the metalliferous component of the catalyst.

While the polymerization process may be carried out in its absence, the use of a component-solubilizing, inert polymerization medium, liquid under the reaction conditions, provides certain advantages in carrying out the polymerization process, and its use is, therefore, desirable. Numerous hydrocarbon compounds including various aliphatics—both saturated and unsaturated, aromatics, substituted aromatics and similar substances, as well as mixtures of them, are satisfactory for the purpose. Reaction media having an appreciable solubilizing effect on the components of the polymerization are to be preferred over materials having only a slight solubilizing effect, and aromatic compounds such as benzene have been found to be particularly adapted to the purpose. The use of at least 5%, by weight, of the latter material, based on the total amount of polymerization solvent medium, is employed in the preferred embodiment of the invention. Among additional suitable media may be mentioned solubilizing compounds or mixtures, containing such materials as toluene, butene, cyclohexene, pentane and the like.

Considerable latitude may be exercised by the practitioner in preparing the stereo-directive catalysts of the invention. One method which has been found convenient, however, consists of initially preparing a solid fusion containing the aluminum halide, the metalliferous component, and the alkali metal halide and subsequently combining the fused mixture with the catalyst regulator to form the active catalyst system. The presence in the catalyst of a relatively small amount of a carbide of the type which on hydrolysis yields acetylene, for example calcium carbide, has been found to enhance the catalyst efficiency, and if desired, a component of the latter type may also be included in the mixture. One of the advantages derived from employing a catalyst fusion in preparing the active catalysts of the invention lies in the fact that such a solid catalyst component may be stored for long periods in a substantially dry, preferably inert atmosphere prior to its use in the polymerization reaction. In addition, solid fusions can readily be added to the reaction mixture, and once added, the former are rapidly dissolved in the mixture. Fusions can easily be prepared by heating the components to the point where a homogeneous liquid results and then cooling the melt until solidification occurs. Although not required, when the catalyst is prepared in a fused form, subsequent attrition into particles of reduced size enables the fusion mixture to be more rapidly incorporated into the catalyst system. A fusion can be formed which contains any desired composition; however, the formation of a eutectic mixture composed of the aluminum halide and alkali metal halide constituents is sometimes of advantage since, among other things, such a mixture, having an appreciably lower melting point than other compositions, substantially reduces the tendency of the aluminum halide to sublime. Following preparation of such a eutectic mixture, the metalliferous component, and if preferred, a carbide such as calcium carbide are dissolved in the eutectic melt to form a unitary mixture. Following its solidification through cooling, the fusion mixture may be employed in the catalyst system in the manner previously described. The composition required to form a eutectic mixture depends, of course, on the identity of its components, and such information can be obtained from any of the standard texts.

Instead of preparing a solid composition as the first operation in a multi-step catalyst preparation procedure, however, a catalyst system capable of efficient conversion of the diolefin monomers to the stereospecific polymers contemplated by the invention can be prepared more directly. This may be accomplished by adding the individual catalyst components including the aluminum halide, the metalliferous constituent, the alkali metal halide, and if desired the calcium carbide, directly to a catalyst solubilizing, inert hydrocarbon which may also serve as the polymerization medium. The mixture may be agitated and, optionally, heated gently to obtain accelerated solution of the ingredients. Following formation of the catalyst solution, the catalyst regulator is added to the system and polymerization commenced through introduction of the monomer.

The amount of catalyst required for successfully practicing the process of the invention depends upon the type of polymeric product sought, the polymerization conditions under which the reaction is to be conducted and similar factors. In any event, the amount of catalyst required is not particularly critical and may be varied within a relatively wide range. In carrying out the polymerizations of the type described, it has been observed that the greater the amount of catalysts included in the reaction mixture, the lower will be the molecular weight of the resulting polymeric product and conversely. The choice of the quantity of catalyst used, therefore, will depend in part upon the molecular weight of the polymer which it is proposed to obtain. In addition, certain materials which are sometimes adventitiously present in the processing equipment have the capability of inactivating various of the catalyst components. In this connection, attention is directed to the previously mentioned interaction of water with the aluminum halide constituent of the catalyst. It is sometimes desirable to add an additional amount of catalyst over that theoretically required, therefore, to compensate for inactivation of the catalyst brought about by the presence of the aforementioned impurities.

Within the foregoing general considerations, however, although less may be used, the addition of an amount of catalyst such that at least 1 mole of aluminum halide is present for every 300 moles of monomer will produce an efficient polymerization, and while more may be present, the use of one mole of the aluminum halide for every 50 moles of monomer employed represents the upper range normally added to the reaction. The use of about 1 mole of aluminum halide for every 100 to 200 moles of monomer present has been found to produce particularly advantageous results, and the use of such quantity is preferred.

While the exact nature of the catalytically active combination of the aluminum halide with the metalliferous component is not fully understood, the evidence tends to indicate, certainly in many of the cases, formation of a complex containing at least two molecules of aluminum halide for each molecule of the metalliferous constituent. It is preferred, therefore, that an amount of the latter component be added such that the mole ratio of the aluminum halide to metalliferous constituent lies within the range of from about 5000 to 2500, to about 5000 to 1, and greater advantages have been found in the use of such catalyst components in a ratio of about 5000 to 500, to about 5000 to 5. It is to be noted that the addition of components in quantities somewhat greater than those indicated will not defeat the desired effect since any excess of the metalliferous ingredient added over the amount necessary for association with the aluminum halide is substantially insoluble in the catalyst system and, therefore, inactive in the reaction while aluminum halide not required in the catalyst apparently does not prevent formation of the stereoregulated polymers.

The alkali metal halide component of the catalyst is, as has been stated, insoluble by itself in the aromatic compounds of the reaction medium, and to achieve solubility, at least about 2 moles of the aluminum halide must be present for each mole of alkali metal halide employed. The incorporation in the catalysts of even relatively small amounts of alkali metal halides favorably affects the activity of the catalyst since the beneficial effect is in proportion to the amount of alkali metal halide dissolved in the reaction mixture; however, the inclusion of the latter material up to its limits of solubility in conjunction with the aluminum halide is to be preferred.

A relatively small amount of calcium carbide included in the reaction mixture has the effect of improving catalytic efficiencies and permits minimum quantities of catalysts to be employed without adverse effect on the activity of the catalyst system. Although such effect becomes noticeable with the addition of as little as about 0.02 mole of carbide for every 100 moles of aluminum halide present, and while more may be added, the use of at least about 1 mole for every 100 moles of aluminum halide employed produces particularly favorable results.

As in the case of the other catalyst components, the amount of regulator required by the process for the production of the more valuable stereoregulated polymers can be adjusted within relatively broad limits. The specific amounts of regulator desirable for the purpose depend, as is to be expected, on variables of the polymerization system including such things as, for example, the quantities of other catalyst components used. The choice of a suitable amount will be determined, therefore, at least in part, on the character of the system in which the regulator is to be employed. In those cases where experience has shown one particular level to be unsatisfactory for producing the desired polymers, the level of regulator may easily be adjusted until the product sought is obtained. Although somewhat less can be used, in most systems where a thiophene compound is employed as the catalyst regulator, incorporation of about 0.5 mole of thiophene compound, or more, for every mole of aluminum halide present has been found to be desirable, and a preferred regulation system consists in the addition of about 1 to 1.5 moles of thiophene compound, or more, for every mole of aluminum halide present. If preferred, thiophene to aluminum halide levels of up to about 5:1 or even somewhat higher may be used.

In those cases where an amine is employed to produce the regulative effect, although somewhat less can be used, the addition of from about 0.5 mole to about 4 moles of the amine compound for every mole of aluminum halide used is satisfactory for the purpose. The preferred range, however, is found where the amount of amine added amounts to from about 0.5 mole to about 2 moles of the amine for every mole of aluminum compound used.

While the use of an inert polymerization medium is not mandatory, employment of such material provides a convenient method by which control of the polymerization reaction may be obtained. For this and other reasons, therefore, the use of such material is preferred. In those variations of the process in which a polymerization medium is used, the addition of such medium in an amount constituting, on a volume basis, from about 0.5 to about 20 times the amount of monomer present comprises a conveniently workable system. When the reactor includes a reflux type condenser, condensation and subsequent return of polymerization medium to the reactor assists in providing temperature regulation of the reaction.

Any within a relatively wide range of temperatures may be selected for carrying out the process, and although temperature control in an area below about 100° C. enables the polymerization to proceed with particular efficiency to produce the desired product, polymerizations conducted within a temperature range of from about −30° C. to little more than about 60° C. have been found to be more advantageous with respect to producing uniformly stereoregulated polymers. Consequently, employment of reaction temperatures within the latter limits is preferred.

As in the case with reaction temperatures, the pressure conditions under which the polymerization is performed may be varied within broad limits. Reduced, as well as pressure greater than atmospheric can be employed; however, for reasons of convenience, maintenance of atmospheric or autogeneous pressure conditions is desirable.

Although practitioners of the invention have considerable freedom in selecting the type of atmosphere under which the reaction is to be carried out, and while the reaction is apparently not as sensitive to the presence of oxygen as in the case of catalyst systems employing organometallic components, the reaction does employ organic solvents of the types previously described, and for this and additional reasons, the use of an inert atmosphere such as argon, nitrogen, helium, hydrocarbon vapor or the like is preferred. Since certain of the catalyst components are sensitive to the presence of water, supra, the system should be protected insofar as possible from contact with water or water vapor. Unless proper care is exercised, water can enter the system through the use of contaminated reaction ingredients, improperly maintained equipment, and in similar ways.

The time required for the polymerization reaction to reach the desired point will depend upon the conversion of monomer it is desired to achieve and various other factors such as the relative, as well as the absolute amounts of reaction ingredients present, the conditions under which the polymerization is carried out and the equipment employed. Generally speaking, however, polymerization of monomeric 1,3-butadiene to a substantially all stereo-regulated polymeric product can be accomplished in no more than about 40 hours, and usually, satisfactory polymerizations can be obtained in considerably less than about 24 hours.

The polymerization reaction may be carried out by means of a batch process as, for instance, by combining the reaction ingredients in a clean, substantially dry reaction vessel, advantageously maintained under an inert atmosphere. Although various orders of addition may be utilized, it is preferred that the catalyst regulator be present in the reaction mixture when the monomer is added in order that the formation of undesirable heterogeneous polymer can be avoided. In addition, when a thiophene compound is to be used as the regulator, it is desirable that the monomer be added to the reaction mixture as soon as practicable follownig addition of the thiophene so little or no polymerization of the latter material occurs either with itself or with the other catalyst components. Introduction of the monomer within a few minutes after addition of the thiophene compound is preferred, and particularly good results in this respect are obtained when the monomer is added within a minute or less following the incorporation of the thiophene compounds. When "secondary" regulators are used in conjunction with the thiophene and the amine regulators disclosed, preferably, the secondary regulators are added soon after the primary regulators, and the monomer is introduced shortly thereafter.

A batch technique, one variation of which has been described above, provides a method by which a high quality product can be made; however, the use of a continuous process is sometimes desirable. A continuous process can be realized by providing for the continual addition of polymerization ingredients to the reaction vessel comprising monomer, an inert polymerization medium—if one is to be used—and the catalyst components (either separately or in the form of a solid fusion), including regulator, as well as for the constant removal of the polymerization mixture for the purpose of catalyst deactivation, polymer separation and subsequent product purification.

After the polymerization has proceeded to the desired point, the reaction may be arrested by deactivating the catalyst in the polymerization mixture. Deactivation may be accomplished by introducing into the mixture substances such as, for example, alcohol, water, acetone, acetic acid, or various other materials which contain active hydrogen ions. Although water is admirably suited to the purpose inasmuch as it is inexpensive and easily handled, organic substances containing active hydrogen ions are particularly suited to the purpose because, among other things, they are usually completely miscible with the reaction mixture and are capable of rapid deactivation of the catalyst. In terminating the polymerization reaction, the deactivating materials may be added directly to the reaction mixture or the mixture itself may be dispersed in the water or other catalyst deactivating substance. When the polymeric product is substantially insoluble and the polymerization medium substantially soluble in the deactivation agent, termination of the polmerization in the latter manner also accomplishes precipitation of the polymer from the mixture. Following production of the polymer in a separable form, either through the addition of the reaction medium to a substance having only a limited solubility for the polymer or by other means, the polymer is separated and treated by washing or otherwise to remove traces of the inactivated catalyst, and then dried. Polymers of the type with which this invention is concerned are stable substances and can be dried at temperatures up to 250° F. or higher. The drying of the polymers may be carried out in a variety of equipment such as hot-air driers, vacuum driers, extruder driers, and various other similar devices.

It is frequently desirable to incorporate antioxidants or other compounding materials with the polymeric product. This may readily be accomplished by introducing such materials into the reaction mixture either prior to, or following precipitation of the polymer. Antioxidants of the type commonly used in natural or styrene-butadiene type rubbers are admirably suited to the protection of the polymer, and the addition of such materials in relatively minor amounts adequately stabilizes the polymer during operations such as drying, processing storage and shipment.

The following examples, while not intended to be limiting in nature, are illustrative of the invention.

EXAMPLE I

In a typical experiment, 2.8 grams of manganese dichloride, 6.0 grams of anhydrous aluminum trichloride—purified by sublimation, and 0.7 gram of sodium chloride is weighed out, mixed and introduced into a glass flask maintained in a dry nitrogen atmosphere. The contents of the flask are heated to approximately 275°–300° C., whereupon the contents melt to form a homogeneous solution. Following the melting process, the flask and its contents are cooled, and a sample of the contents is withdrawn for analysis. Examination of the material shows it to have composition equivalent to 1.9

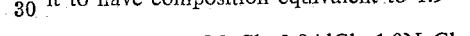
$MnCl_2 \cdot 3.8AlCl_3 \cdot 1.0NaCl$

A 6 oz. polymerization bottle, dried in a hot-air oven and cooled under dry nitrogen, is charged with 0.49 gram of the catalyst mixture. Following addition of the catalyst in the presence of a substantially dry, nitrogen atmosphere, 90.5 grams of benzene, i.e., dried by contact with a molecular sieve adsorbent, sieve-dried before being refluxed with a sodium-potassium alloy/benzophenone mixture and distilled under nitrogen, are introduced into the bottle under a nitrogen atmosphere, and the latter is closed with a permeable cap, i.e., a puncturable, self-sealing cap. Approximately 0.2 milliliter of thiophene, dried over magnesium sulphate, is charged to the bottle through the cap by means of a hypodermic syringe, the bottle is shaken, and 4.0 grams of special purity 1,3-butadiene, previously passed through a column containing a molecular sieve adsorbent are also introduced into the bottle by means of the hypodermic syringe. Following addition of all ingredients, the polymerization bottle is pressured to 15 lbs. with nitrogen and placed in a 30° C. polymerization bath where it is allowed to remain for a period of about 48 hours. At the conclusion of the polymerization period, the contents of the bottle are short-stopped, that is, the catalyst is deactivated through the introduction of 10 milliliters of tetrahydrofuran, and a dispersion of an age resistor in benzene is added. After the polymerization has been thus terminated, the bottle is uncapped and its contents poured into approximately 600 milliliters of methanol containing PBNA, i.e., phenyl-β-naphthyl amine. The polymeric product resulting from the procedure consists of 1.42 grams of a liquid substance which upon examination proves to have 88% of the cis and 9.0% of the trans polymer, while possessing a 1,2-structure amounting to only 3.3% of the total product.

In a substantially identical experiment, the principal difference being the use of 0.4 milliliter of thiophene rather than the 0.2 milliliter used above. 0.69 gram of a liquid product containing 90% of the cis, 6.7% of the trans type polymers, and having only 3.7% of the 1,2-type product is obtained.

A liquid polymer of the type described is particularly useful as a plasticizing material which when added to high viscosity, cis-type polybutadiene polymers produces a product possessing good processing characteristics.

EXAMPLE II

In this experiment, a catalyst solution is prepared by weighing out 1.0 gram of cobalt dichloride, 2.0 grams of aluminum trichloride—of the kind used in Example 1, and 0.5 gram of potassium chloride. The materials are added to a flask containing 101.0 grams of specially prepared benzene, infra—Example 1, and the mixture is heated at 50° C., under a substantially dry nitrogen atmosphere. Heating is carried on for 2½ hours before being discontinued and the contents of the flask allowed to cool and settle for 45 minutes. A somewhat discolored, green supernatant solution is obtained by the procedure. Upon analytical examination, a representative portion of the supernatant liquid is shown to have a composition equivalent to 0.0197 gram millimole of aluminum trichloride, 0.0028 gram millimole of cobalt dichloride, and 0.0008 gram millimole of potassium chloride, for each milliliter of the solution.

A polymerization tube, i.e., a hollow glass tube approximately 1 in. in diameter, 1 ft. long, and closed on one end is oven-dried, cooled to room temperature under a dry nitrogen blanket, and capped with a permeable seal. The following materials are then introduced into the tube by means of a hypodermic syringe, in the order appearing: 20 milliliters of specially treated benzene, 15 milliliters of the supernatant catalyst solution, 0.2 milliliter of previously dried thiophene and 1.9 grams of the high-purity 1,3-butadiene monomer. Immediately after addition of the thiophene, the tube is shaken, and the butadiene is charged without delay. Following charging of the reaction ingredients, the tube and its contents are maintained at room temperature, i.e., approximately 22° C. and the reaction is permitted to proceed for 23.5 hours. At the end of such time, the polymerization is shortstopped by the addition of 5 milliliters of tetrahydrofuran, and an age resistor is added, all additions being made by means of a hypodermic syringe. After the reaction has been thus terminated, the tube is uncapped, and its contents emptied into a suitable vessel containing methanol and phenyl-$\beta$-naphthyl amine. The resulting precipitate is allowed to settle; the methanol is decanted, and the polymer is dried in a vacuum oven at 50° C. The product contains a solid, rubbery polymer comprised of 95% cis and 3.5% of the trans structure. Only 1.8% of the undesirable 1,2-type material results from the procedure.

EXAMPLE III

An active catalyst solution is prepared by heating in a substantially dry inert atmosphere 1.32 grams of cobalt dichloride, 4.02 grams of aluminum trichloride, 0.44 gram of lithium chloride, and 153 grams of specially treated benzene. The heating is carried out at the reflux temperature of the mixture for 4 hours; after which time, the contents are allowed to cool and settle. A clear, deep green supernatant solution which has a composition equivalent to 0.17 gram millimole of aluminum trichloride 0.017 gram millimole of cobalt dichloride and about 0.04 gram millimole of lithium chloride, per milliliter of solution, is obtained by the procedure.

A polymerization tube of the type previously described in connection with the experiment of Example II is prepared in the manner described therein. A syringe is employed to introduce, in the order shown, 30 milliliters of specially treated benzene, 5 milliliters of the supernatant catalyst solution, infra, and 0.2 milliliter of dry thiophene. Following addition of the thiophene, the polymerization tube is agitated vigorously, and 2.2 grams of special purity butadiene are immediately added. The polymerization reaction begins immediately, and a very viscous polymer solution is rapidly formed. The reaction is continued for about ½ hour at about 22° C. before being shortstopped with milliliters of tetrahydrofuran and age resistor added in the manner of the Example II. The contents of the tube are emptied into a methanol-PBNA solution where the polymer is percipitated and allowed to settle. The methanol is thereafter decanted, and the polymer is dried in a vacuum oven at approximately 50° C. A product consisting of 1.84 grams of a tough, dry elastomer having a structure comprised of 99% cis and 0.4% of the trans polymer is found to have resulted from the experiment. Because of its high cis content, and because the product contains only 0.7% of the 1,2 type polymer, the elastomer is extremely valuable, being of a type which finds wide application in a variety of industrial and domestic uses.

EXAMPLE IV

In this procedure, a catalyst fusion mixture is prepared by combining in a pyrex tube 4.1 grams of chromium dichloride, 10.9 grams of aluminum trichloride and 1 gram of sodium chloride. After the catalyst ingredients have been added, the tube is sealed and heated at about 300° C. until the contents have melted to form a homogeneous solution. The melt is then cooled to its solidification temperature and by analysis is determined to have a composition equivalent to $2CrCl_2 \cdot 4.8AlCl_3 \cdot NaCl$.

A 6 oz. polymerization bottle, previously oven dried and cooled to room temperature in substantially dry nitrogen, is charged with 0.56 gram of the fusion mixture described—the latter addition being made in a nitrogen-swept "dry bag," i.e., a container arranged to permit manipulation of its contents while maintaining such contents isolated from contact with the atmosphere. Approximately 86.8 grams of specially purified benzene are charged to the bottle under the nitrogen atmosphere, and the bottle is capped with a puncturable cap. Dry thiophene is charged to the bottle with a hypoderic syringe; the contents of the bottle are mixed by shaking, and 4.1 grams of high purity butadiene are immediately introduced by means of the syringe. Following introduction of the 1,3-butadiene, the bottle is pressured to 15 lbs. with nitrogen and placed in a 30° C. constant temperature bath for 20 hours. At the end of this time, the contents of the bottle are shortstopped by the addition of 10 milliliters of tetrahydrofuran, and an age resistor is added. The bottle is subsequently uncapped, and its contents are mixed with 600 milliliters of a methanol-PBNA solution. Coagulation of the fine polymer particles, which are precipitated and gradually settle to the bottom of the container following addition of the reaction mixture to the alcohol-PBNA solution, is prompted by the addition of a small amount of dilute hydrochloric acid. At the conclusion of the formation of solid polymer, the methanol solution is decanted, and the polymer is dried in a vacuum oven at 50° C. About 0.78 gram of a sticky liquid suitable for, among other things, plasticizer use is produced by this method, containing 87% cis- 10.2% trans polymer and only 2.7% of the 1,2 polymer.

EXAMPLE V

In this Example 3.9 grams of ferrous chloride, 10.4 grams of aluminum trichloride, and 0.8 gram of sodium chloride are placed in a Pyrex tube; the tube is sealed, and its contents are fused at a temperature approximating 300° C. The composition which results proves to have a composition equivalent to $2.3FeCl_2 \cdot 5.7AlCl_3 \cdot 1.0NaCl$.

In a procedure similar to that of Example IV, 84.7 grams of benzene are added to a 6 oz. oven-dried polymerization bottle which has been cooled and charged with 0.56 gram of the catalyst fusion in a nitrogen-swept dry bag. The thiophene, 0.25 milliliter and 4.2 grams of 1,3-butadiene are introduced into the reaction mixture in the manner of Example IV; the vessel is charged with 15 lbs. of nitrogen pressure, and the polymerization reaction is continued for 20 hours at a temperature of 30° C. Following a work-up substantially identical to that of the preceding experiment, 0.18 gram of an elastomeric product having a structure consisting of 84% cis, 13% trans, and 3% 1,2-polymer is obtained.

EXAMPLE VI

In this example, a mixture containing 7.3 grams of titanium dichloride, 16.6 grams of aluminum trichloride, and 1.9 grams of sodium chloride is fused in a sealed Pyrex tube at a temperature of 275° to 300° C. A solid fusion product having a thin upper blue-green layer, a black lower and possessing a composition equivalent to $1.8TiCl_2 \cdot 3.8AlCl_3 \cdot 1.0NaCl$ results. An experimental procedure employing the fusion mixture for catalyst purposes is conducted substantially as follows: an oven-dried, 6 oz. polymerization bottle, previously dried in a hot-air oven and cooled in an inert atmosphere, e.g., dry nitrogen, is charged with 0.36 gram of the blue-green solid layer of the fusion mixture. Approximately 88 grams of special purified benzene is charged, under nitrogen, and the bottle is sealed with a puncturable cap. Substantially dry thiophene, 0.5 milliliter, is charged to the polymerization bottle with a hypodermic syringe; the bottle is shaken; 4.2 grams of high-purity 1,3-butadiene monomer is added, and the bottle is pressured to 15 lbs. with nitrogen. Almost immediately following addition of the butadiene, the bottle becomes noticeably warm, and its contents have a pronounced tendency to foam when shaken. After polymerization for 16 hours in a 30° C. constant temperature bath, the reaction mixture is shortstopped and worked-up in the manner previously described in Example V. The procedure yields 1.8 grams of a fibrous polymer containing almost 100% of a crystalline trans structure which has an extremely low 1,2 content. Due to its hard, tough, inelastic nature, a polymer of this type can be used in many applications in which a substantially all-cis product would be unsuitable such as in golfball covers and the like where natural balata has been employed.

An identical experiment employing, however, 0.56 gram of the black catalyst layer produces 1.5 grams of a similar polymer.

EXAMPLE VII

In experiments which permit comparison of the method of the invention with one of the processes previously suggested, a series of experiments is conducted in which a solution containing $AlCl_3$ and $CoCl_2$ in benzene is added to 105 milliliters of benzene. Approximately 0.6 milliliter of thiophene is charged to the reaction mixture, and about 5.7 to 6.0 grams of 1,3 butadiene are added shortly thereafter to initiate the reaction, which is carried out under nitrogen. After the polymerization times appearing, infra, the reaction is terminated by the addition of methanol, and the polymer is worked-up in methanol in the usual manner. In this fashion, 4 runs are completed under the conditions and with the results shown:

| Run No. | 1 | 2 | 3 |
|---|---|---|---|
| Gram millimoles $AlCl_3$ | 1.98 | 1.92 | 1.83 |
| Gram millimoles $CoCl_2$ | 0.38 | 0.288 | 0.192 |
| Time, hours | 5 | 5 | 20 |
| Yield, grams | 4.5 | 4.5 | 0 |
| Yield, percent | 75 | 79 | 0 |

A second series of runs, identical with the first series except that approximately 7.4 grams of the butadiene are employed, produces the results tabulated below:

| Run No. | 1 | 2 | 3 |
|---|---|---|---|
| Gram millimoles $AlCl_3$ | 1.68 | 1.68 | 1.68 |
| Gram millimoles $CoCl_2$ | 0.26 | 0.19 | 0.13 |
| Time, hours | 24 | 24 | 48 |
| Yield, grams | 3.3 | 3.6 | 0 |
| Yield, percent | 46 | 50 | 0 |

In a third series of experiments, conducted according to the method of the invention, $AlCl_3$, $CoCl_2$, NaCl and KCl are added to 100 milliliters of benzene and mixed, first for from 3 to 4 hours at 30° C., and then for an additional ½ to 1 hour at 50° C. to insure solution of the salts. Following solution of the solids, thiophene in the amount appearing in the table below is introduced into the reaction mixture, and 4.5 grams of 1,3-butadiene are added, starting the polymerization which is conducted in a nitrogen atmosphere. At the end of the time indicated, the reaction is terminated and the product worked-up in the usual (above) manner. Experimental details and the results produced are as follows:

| Run No. | 1 | 2 | 3 |
|---|---|---|---|
| Gram millimoles $AlCl_3$ | 1.32 | 1.32 | 1.38 |
| Gram millimoles $CoCl_2$ | 0.00097 | 0.00097 | 0.0010 |
| Gram millimoles NaCl | 0.40 | 0.40 | 0.41 |
| Gram millimoles KCl | 0.26 | 0.26 | 0.28 |
| Thiophene, ml | 0.10 | 0.15 | 0.20 |
| Time, hours | 15.75 | 15.75 | 15.75 |
| Yield, grams | 3.1 | 3.96 | 3.99 |
| Yield, percent | 69 | 88 | 89 |

In a fourth series of experiments, also conducted in accordance with the invention disclosed herein according to the procedure detailed in series 3, the following results are produced:

| Run No. | 1 | 2 | 3 | 4 |
|---|---|---|---|---|
| Gram millimoles $AlCl_3$ | 1.44 | 1.26 | 1.44 | 1.32 |
| Gram millimoles $CoCl_2$ | 0.00011 | 0.00095 | 0.00011 | 0.00010 |
| Gram millimoles of NaCl | 0.43 | 0.38 | 0.43 | 0.40 |
| Gram millimoles of KCl | 0.29 | 0.25 | 0.29 | 0.26 |
| Thiophene, ml | 0.05 | 0.10 | 0.15 | 0.20 |
| Time, hours | 17.3 | 17.3 | 17.3 | 17.3 |
| Yield, grams | 0.10 | 0.31 | 0.48 | 0.53 |
| Yield, percent | 2.2 | 6.9 | 10.5 | 12 |

A comparison of the first two series of experiments with the third and fourth series of experiments, the latter two series being performed in accordance with the invention disclosed herein, clearly demonstrates some of the advantages which may be realized through use of the invention. While such minimal use is, of course, economically undesirable in view of the low yield of product, it is to be observed that polymer may still be obtained at a level of approximately 0.0001 gram millimole of $CoCl_2$, under the conditions of the experiment, when the process is conducted in accordance with the invention disclosed. When, however, the process is carried out in the manner of the competitive process shown, the polymerization fails to occur even at levels of about 0.198 gram millimole of $CoCl_2$. Since, as has been previously stated, the metalliferous component is one of the most expensive ingredients of catalysts of the inorganic type, a process which permits substantial reductions in its use has an inherent economic advantage over other types of processes.

EXAMPLE VIII

In an additional experiment, 100 milliliters of benzene is combined with 0.365 gram of the "inorganic" constituents of the catalysts, the latter being present in the following molar ratio; $AlCl_3$—66.5 mole percent, $CoCl_2$—0.14 mole percent, NaCl—20 mole percent, KCl—13 mole percent, $CaC_2$—0.078 mole percent. The mixing of the ingredients is conducted at a temperature of 50° C. for approximately 45 minutes after which 0.72 gram millimole of thiophene is added, followed by 0.10 gram millimole of n-propyl sulfide and 4.5 grams of 1,3-butadiene.

The reaction, which commences upon addition of the monomer, is carried out under nitrogen for 6 hours at 30° C. before the polymerization is terminated and the product worked-up with methanol. Approximately 0.54 gram of elastomer is obtained by the procedure which, upon analysis by infra red means, proves to have 96% cis, 3% trans, and only 1% of the 1,2 type polymer.

EXAMPLE IX

In still another experiment, 0.42 gram of the inorganic constituent of the catalyst described in Example VIII is introduced into 100 milliliters of benzene where it is mixed at 50° C. for approximately 45 minutes. After incorporation of the solids, 0.61 gram millimole of thiophene is added to the reaction mixture followed thereafter by 0.1 gram millimole of pyridine and 4.5 grams of 1,3-butadiene.

The polymerization is carried out in an inert atmosphere for a period of 26 hours at about 30° C. to yield 2.16 grams of an elastomer producing an infra red analysis which indicates the product to contain 96% of the cis, 2.5% of the trans, and only about 1% of the 1,2 type polymer. A polymer possessing such a highe percentage of the cis configuration polymer is a material widely sought by producers of those types of rubber goods requiring the superior physical properties displayed by elastomers possessing a high cis content.

EXAMPLE X

In this example, 0.25 gram of the inorganic catalyst constituent, the latter having a composition such that it contains 67 mole percent $AlCl_3$, 20 mole percent NaCl, 13 mole percent KCl, 0.2 mole percent $CoCl_2$, and 0.08 percent of $CaC_2$ is added to a vessel containing 100 ml. of benzene. The mixture is heated to 50° C. and stirred for 50 minutes before 0.51 gram millimole of thiophene, 0.04 gram millimole of tetrahydrofuran, and 4.5 grams of 1,3-butadiene are added in the order appearing. In the course of the experiment, the reaction is continued under nitrogen for a period of 22½ hours, during which time the temperature is controlled at 30° C. The procedure yields 1.16 grams of product having a typically high cis content and only a minimum of the objectionable 1,2 type polymer.

EXAMPLE XI

In this experiment, about 0.265 gram of the inorganic constituent of the catalyst described in Example X is added to 100 milliliters of benzene, and the mixture is thoroughly mixed at 50° C. for approximately 53 minutes. Following the mixing, 0.55 gram millimole of thiophene is added to the reaction, immediately followed by 0.1 gram millimole of n-butyl sulfide and about 4.5 grams of monomeric 1,3-butadiene. Upon addition of the monomer, the polymerization reaction commences and is permitted to continue under nitrogen at a controlled temperature of 30° C. for a period of about 20½ hours. By this technique, 1.8 grams of product is produced which, upon examination by infra red, proves to have a high portion of the valuable cis 1,4 product and to contain only a minimum of the undesirable 1,2 polymer.

EXAMPLE XII

An experiment is conducted in which 0.22 gram of the inorganic constituent of the catalyst, the latter containing 65 mole percent $AlCl_3$, 34 mole percent NaCl and 1 mole percent $NiCl_2$, is added to approximately 100 milliliters of benzene. The resulting mixture is heated to 50° C. and mixed for about 47 minutes before the balance of the reaction mixture, including 0.13 gram millimole of thiophene, 0.27 gram millimole of n-propyl sulfide and 4.5 grams of monomeric 1,3-butadiene, is added in the order appearing.

The polymerization reaction is controlled at 30° C., under an inert atmosphere, and allowed to continue for 30 minutes to produce a yield of approximately 0.71 gram of an oily polymeric product. Polymers of the type produced by the experiment may be used to advantage as a plasticizing ingredient for elastomeric polymers of relatively high molecular weight thereby producing a plasticized mixture which lends itself to processing by standard machinery.

EXAMPLE XIII

According to this procedure, 0.20 gram of the inorganic constituent of the catalyst described in Example XII is mixed with 100 milliliters of benzene, and the mixture is maintained at a temperature of approximately 50° C. for a period of 47 minutes. At the end of the time, 0.29 gram millimole of n-propyl sulfide is added to the reaction mixture followed by 4.5 grams of 1,3-butadiene. In the course of the experiment, the polymerization is permitted to continue under an inert atmosphere for a period of about 22¼ hours, during which time the reaction is controlled at 30° C.

The polymer produced is in the form of an oil, and infra red analysis shows it to have 89% of the cis, 7% of the trans and 4% of the 1,2 type polymer. As previously mentioned, this type of product is admirably suited for use as a plasticizing material.

EXAMPLE XIV

Approximately 0.255 gram of the inorganic constituent of the catalyst previously described in connection with the experiment of Example X is in this experiment added to 100 milliliters of benzene. The mixture is thoroughly mixed for 53 minutes at a temperature of 50° C., following which 0.50 gram millimole of n-butyl sulfide is added to the mixture followed by 4.5 grams of monomeric 1,3-butadiene.

The polymerization is continued under nitrogen for about 20½ hours; during which time, the temperature is controlled at 30° C.; however, in this experiment, the reaction mixture is thereafter left standing for a period of 5 days at room temperature before being terminated by menthanol and worked-up in the normal fashion. The procedure produces a yield of about 0.14 gram of a solid elastomeric product showing an infra red analysis of 93% cis, 5% trans and 2% of the 1,2 polymer.

EXAMPLE XV

In this example, 0.48 gram of a catalyst mixture compounded to contain 2.8 gram millimoles of $AlCl_3$, 0.86 gram millimole of NaCl, 0.23 gram millimole of KCl and 0.034 gram millimole of $MgCl_2$ is added to a polymerization vessel containing 100 milliliters of benzene. The contents of the reactor are heated and stirred at a temperature, and for a time sufficient to produce substantially complete solubilization of the ingredients. At the conclusion of the solution process, approximately 3.2 gram millimoles of thiophene are introduced into the reaction vessel, and 4.5 grams of 1,3-butadiene are added immediately thereafter. The polymerization is continued under a nitrogen atmosphere for 3½ hours at a controlled temperature of 30° C. The resulting product, following reaction termination and work-up in methanol, consists of 1.54 grams of an oil type polymer which is established by infra red analysis to contain 80% of the cis, 8% of the trans and 4% of the 1,2 type polymer.

EXAMPLE XVI

In another experiment, about 0.45 gram of a mixture, comprising the inorganic portion of the catalyst, which contains 2.7 gram millimoles of $AlCl_3$, 0.81 gram millimole of NaCl, 0.48 gram millimole of KCl, and 0.22 gram millimole of $BeCl_2$ is combined with 100 milliliters of benzene. The mixture is mixed and heated at 30° C. for a period of approximately 3 hours before 3.2 gram millimoles of thiophene and 4.5 grams of monomeric 1,3-butadiene are added, in that order, and the polymerization thereby initiated. The polymerization reaction is continued in a nitrogen atmosphere for a period of 24 hours during which time the reaction temperature is maintained at 30° C. The reaction produces 1.5 grams of a polymeric product containing 95% of the cis, 4% of the trans and only 1% of the undesirable 1,2 polymer. In deference to the toxic nature of the beryllium compound, due care is exercised in carrying out the above procedure.

EXAMPLE XVII

In this example, 0.31 gram of a catalyst mixture which consists of 1.7 gram millimoles of $AlCl_3$, 0.39 gram millimole of NaCl, 0.25 gram millimole of KCl and 0.25 gram millimole of $VCl_3$ is added to 100 milliliters of benzene, and the mixture is thoroughly mixed for a period of 1 hour at 30° C. Following substantial solution of the foregoing components, 3.9 gram millimoles of thiophene are added to the reaction and 4.5 gram millimoles of 1,3-butadiene is introduced within a short time thereafter to initiate the polymerization. The reaction is continued for a period of 21 hours in a nitrogen atmosphere at a temperature of 30° C. to give 0.30 gram of a trans polybutadiene polymer. The product is shown by infra red analysis to possess substantially 100% of the trans configuration.

What is claimed is:

1. A process for producing a substantially all 1,4 addition polybutadiene product comprising polymerizing monomeric 1,3-butadiene in a substantially dry, inert atmosphere, at a temperature below about 100° C. and in the presence of a reaction solubilizing inert hydrocarbon polymerization medium, with a catalyst composition comprised of an aluminum trihalide; a metaliferous component selected from the group consisting of metals and compounds of metals of beryllium, magnesium, cobalt, nickel, titanium, vanadium, chromium, manganese, iron, platinum and palladium; an alkali metal halide; and a thiophene catalyst regulator component selected from the group consisting of thiophene and aliphatic hydrocarbon substituted thiophene, the components of said catalyst being present in a ratio such that, on a molar basis, the aluminum trihalide constitutes at least about twice the amount of the metalliferous component, at least about twice the amount of the alkali metal halide component, but no more than about twice the amount of thiophene catalyst regulator component employed, and at least about one mole of aluminum trihalide is present for every 300 moles of said butadiene.

2. A process according to claim 1 in which the metalliferous component is a substance selected from the group consisting of cobalt and compounds of cobalt.

3. A process according to claim 1 in which the metalliferous component is a substance selected from the group consisting of nickel and compounds of nickel.

4. A process according to claim 1 in which, on a molar basis, about one-third of the thiophene compound is replaced with at least one secondary regulator selected from the group consisting of n-propyl sulfide, n-butyl sulfide, t-butyl sulfide, pyridine, triethyl amine, tri-n-amyl amine, and tetrahydrofuran.

5. A process for producing a substantially all 1,4 addition polymeric product comprising polymerizing a monomeric 1,3-diolefin in a substantially dry, inert atmosphere, at a temperature below about 100° C. and in the presence of a reaction solubilizing, inert hydrocarbon polymerization medium, with a catalyst composition comprised of an aluminum trihalide; a metalliferous component selected from the group consisting of metals and compounds of metals of cobalt and nickel; an alkali metal halide; and a catalyst regulator component which includes a member of the group selected from thiophene and aliphatic hydrocarbon substituted thiophene, the components of said catalyst being present in a ratio such that, on a molar basis, the aluminum trihalide constitutes at least about twice the amount of the metalliferous component, at least about twice the amount of the alkali metal halide component, and at least about one mole of aluminum trihalide is present for every 300 moles of said 1,3-diolefin.

6. A process for producing a substantially all 1,4 addition polybutadiene product comprising polymerizing monomeric 1,3-butadiene in a substantially dry, inert atmosphere, at a temperature below 100° C. and in the presence of a reaction solubilizing, inert hydrocarbon polymerization medium, with a catalyst composition comprised of an aluminum trihalide; a metalliferous component including a member selected from the group consisting of metals and compounds of metals of cobalt, nickel and titanium; and a thiophene catalyst regulator component selected from the group consisting of thiophene and aliphatic hydrocarbon substituted thiophene, the components of said catalyst being present in a ratio such that, on a molar basis, the aluminum trihalide constitutes at least about twice the amount of metalliferous component, at least about twice the amount of the alkali metal halide component, but no more than about five times the amount of thiophene catalyst regulator component, and at least about one mole of aluminum trihalide is present for every 300 moles of said 1,3-butadiene.

References Cited

UNITED STATES PATENTS

| 2,082,500 | 6/1937 | Kuentzel | 260—683.15 |
| 2,085,535 | 6/1937 | Langedijk et al. | 260—94.2 |
| 2,710,854 | 6/1955 | Seelig | 260—94.9 |
| 2,899,413 | 8/1959 | Hagemeyer et al. | 260—94.945 |
| 3,066,125 | 11/1962 | Porter et al. | 260—94.3 |
| 3,149,174 | 9/1964 | Mueller | 260—666 |

FOREIGN PATENTS

| 878,120 | 9/1961 | Great Britain. |
| 340,474 | 12/1930 | Great Britain. |

JOSEPH L. SCHOFER, *Primary Examiner.*

E. J. SMITH, R. A. GAITHER, *Assistant Examiners.*